United States Patent [19]
Ng et al.

[11] Patent Number: 6,011,679
[45] Date of Patent: Jan. 4, 2000

[54] METHODS AND APPARATUS FOR CONTROLLING A POWER SUPPLY WITH IMPROVED TECHNIQUES FOR PROVIDING PROTECTION LIMITS

[75] Inventors: William Ng, Leominster; Bernhard Schroter, Upton, both of Mass.

[73] Assignee: Digital Equipment Corp., Houston, Tex.

[21] Appl. No.: 09/163,705

[22] Filed: Sep. 30, 1998

[51] Int. Cl.$^7$ .............................. H02H 7/00; H02H 7/10
[52] U.S. Cl. .............................................. 361/18; 363/50
[58] Field of Search ................................ 363/50, 52, 55; 361/18, 86, 90, 91, 92

[56] References Cited

U.S. PATENT DOCUMENTS

| | | | |
|---|---|---|---|
| 3,925,709 | 12/1975 | Mitchell et al. | 317/33 VR |
| 4,544,981 | 10/1985 | Hakooplan | 361/93 |
| 4,975,883 | 12/1990 | Baker et al. | 365/226 |
| 5,615,097 | 3/1997 | Cross | 363/84 |
| 5,825,600 | 10/1998 | Watt | 361/56 |

OTHER PUBLICATIONS

"Product & Applications Handbook 1995–96," Unitrode Integrated Circuits Corporation, Merrimack, NH, pp. 6–158 to 6–165, Jan. 1995.

*Primary Examiner*—Matthew Nguyen
*Attorney, Agent, or Firm*—Hamilton, Brook, Smith & Reynolds, P.C.

[57] ABSTRACT

A technique for controlling a power supply involves receiving a programming signal that indicates a power supply output voltage limit, activating the power supply such that the power supply provides a power supply output voltage according to a power supply threshold voltage, generating a tracking signal that tracks the programming signal, and generating a compare signal according to the tracking signal and an actual value of the power supply output voltage. The technique further involves comparing the compare signal to a protection threshold voltage, maintaining activation of the power supply when the compare signal is less than the protection threshold voltage, and deactivating the power supply when the compare signal is greater than the protection threshold voltage. The protection threshold voltage is independent of the power supply threshold voltage. In particular, a power supply threshold reference source provides the power supply threshold voltage, a protection threshold reference source, which is independent of the power supply threshold reference source, provides the protection threshold voltage.

20 Claims, 5 Drawing Sheets

| Provided Between Input Pin and Ground Pin | Programming Signal | $V_{out}$ |
|---|---|---|
| 500Ω or 0.5V | 0.5V | $V_{prog} - (0.10)V_{prog}$ |
| 1KΩ or 1.0V | 1.0V | $V_{prog}$ |
| 1.5KΩ or 1.5V | 1.5V | $V_{prog} + (0.10)V_{prog}$ |
| Open (∞Ω) | 1.0V | $V_{prog}$ |

FIG. 2

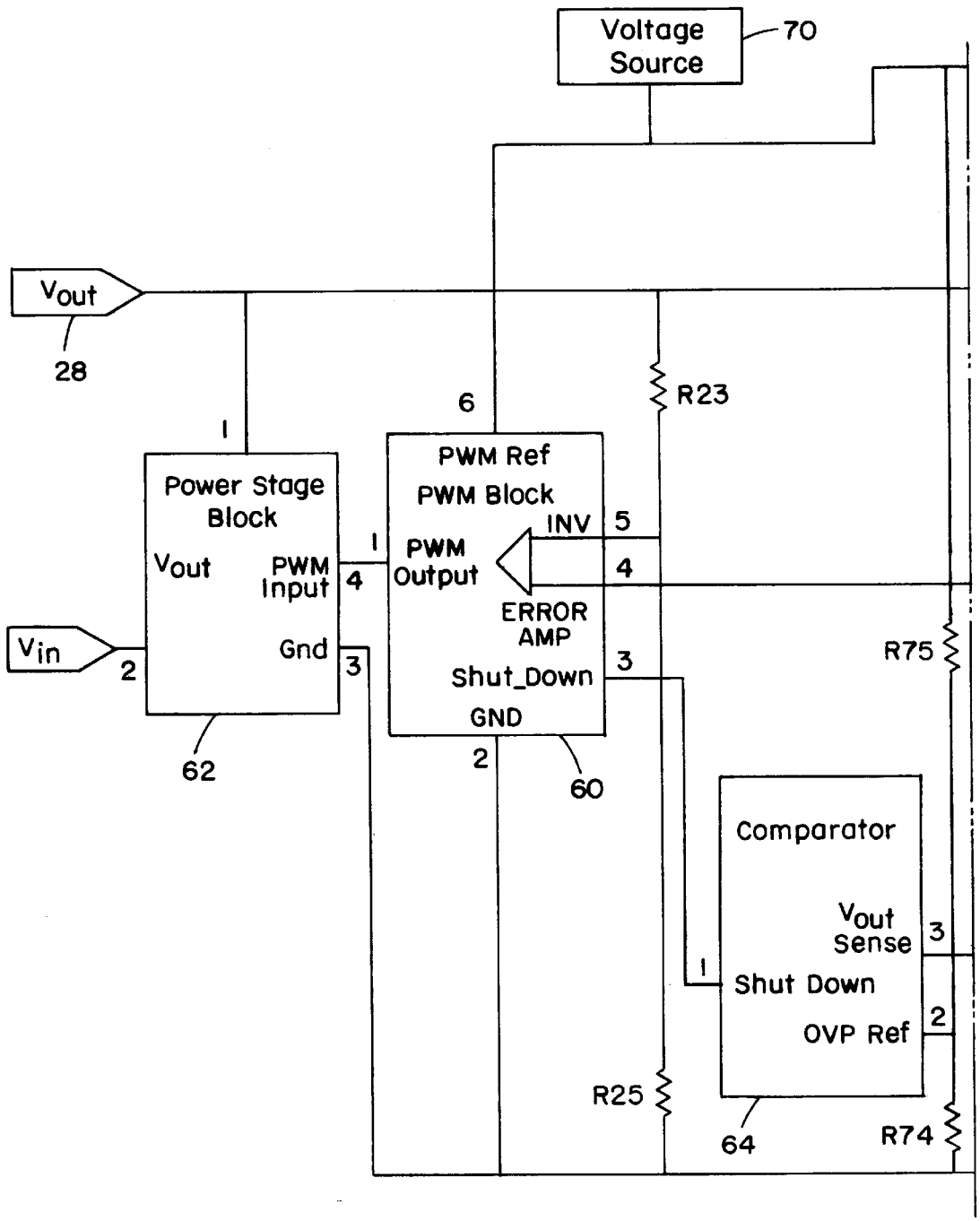

FIG. 4

| Output Voltage | Voltage Across R74 | Voltage Across R43 | Programming Signal | Connection Condition | Protection Limit | Voltage Across R43 When Output Voltage is at Protection Limit |
|---|---|---|---|---|---|---|
| 3.30 | 1.50 | 1.283 | 1.0 | OPEN | 3.783 | 1.50 |
| 3.30 | 1.50 | 1.283 | 1.0 | 1K or 1.0V | 3.783 | 1.50 |
| 2.97 | 1.50 | 1.283 | 0.5 | 0.5K or 0.5V | 3.408 | 1.50 |
| 3.63 | 1.50 | 1.283 | 1.5 | 1.5K or 1.5V | 4.158 | 1.50 |

Absolute OVP MAX for 3.3V is 4.384V

FIG. 5

| Output Voltage | Voltage Across R74 | Voltage Across R43 | Programming Signal | Connection Condition | Protection Limit | Voltage Across R43 When Output Voltage is at Protection Limit |
|---|---|---|---|---|---|---|
| 2.20 | 1.50 | 1.283 | 1.0 | OPEN | 2.522 | 1.50 |
| 2.20 | 1.50 | 1.283 | 1.0 | 1K or 1.0V | 2.522 | 1.50 |
| 1.98 | 1.50 | 1.283 | 0.5 | 0.5K or 0.5V | 2.273 | 1.50 |
| 2.42 | 1.50 | 1.283 | 1.5 | 1.5K or 1.5V | 2.772 | 1.50 |

Absolute OVP MAX for 2.2V is 2.882V

METHODS AND APPARATUS FOR CONTROLLING A POWER SUPPLY WITH IMPROVED TECHNIQUES FOR PROVIDING PROTECTION LIMITS

BACKGROUND OF THE INVENTION

A typical trimmable power supply allows its output voltage to be adjusted slightly (or trimmed) up or down. Generally, an adjustment is made to the output voltage by changing a voltage at a dedicated output voltage adjustment pin. The voltage may be changed by changing an external resistance that is provided between the dedicated output voltage adjustment pin and a ground pin of the power supply or by applying an external voltage to the pin. For example, suppose a particular trimmable power supply provides 3.0 volts when 1K ohms is provided between its dedicated output voltage adjustment pin and ground pin. The output voltage may be trimmed to 2.7 volts by changing the resistance between these pins from 1K ohms to 500 ohms. Similarly, the output voltage may be trimmed to 3.3 volts by changing the resistance to 1.5K ohms.

Some trimmable power supplies generate output voltages using pulse width modulation (PWM). In such a power supply, an independent voltage source provides a power supply threshold voltage as a reference. Then, a PWM comparator provides a modulating pulse signal based on a comparison between the power supply threshold voltage and the power supply output voltage. The power supply output voltage is provided across a capacitor, and the modulating pulse signal opens and closes a switch that controls the charging of the capacitor. In particular, when the modulating pulse signal closes the switch, the capacitor charges and the power supply output voltage increases. On the other hand, when the modulating pulse signal opens the switch, no charge is provided to the capacitor and any externally connected circuits that draw charge from the capacitor cause the power supply output voltage to decrease.

Since externally connected circuits may draw charge from the capacitor, and since the capacitor charges only when the switch is closed, increasing the percentage of time in which the switch is closed (i.e., increasing the duty ratio of the modulating pulse signal) increases the power supply output voltage. Conversely, decreasing the percentage of time in which the switch is closed decreases the output voltage.

A typical trimmable power supply further includes a protection circuit that limits its output voltage. If the power supply output voltage exceeds the intended value by more than a certain percentage (e.g., 120%), the protection circuit typically deactivates (or shuts down) the power supply before it damages itself and any connected circuits. For example, a power supply that is adjusted to provide an output voltage of 3.0 volts may have an output voltage limit (or protection limit) of 3.6 volts. If the power supply operates improperly and attempts to provide more than 3.6 volts, the protection circuit of the power supply shuts down the power supply.

A typical power supply protection circuit includes a protection comparator having one input that receives the power supply output voltage, and another input that receives a protection threshold voltage (e.g., a voltage that is 120% of the intended output voltage). When the output voltage of the power supply exceeds the protection threshold voltage, the protection comparator generates a shutdown signal that shuts down the power supply (e.g., by preventing the PWM comparator from closing the switch that charges the capacitor providing the power supply output voltage). Generally, in a trimmable power supply that uses PWM, the same independent voltage source that provides the power supply threshold voltage to the PWM comparator also provides the protection threshold voltage to the protection comparator.

When trimming of the power supply output voltage occurs, trimming of the protection limit should be performed as well to preserve the same protection margin (e.g., 20%). For example, when the power supply output voltage is trimmed from 3.0 volts to 3.3 volts, the protection limit should be trimmed from 3.6 volts to 3.96 volts.

Since the protection limit is higher than the power supply output voltage, trimming adjustments generally are performed using separate adjustment pins. For example, when trimming the power supply voltage from 3.0 volts to 3.3 volts by changing a resistance from 1K ohms to 500 ohms between a dedicated output voltage adjustment pin and a ground pin, a corresponding trimming of the protection voltage from 3.6 volts to 3.96 volts typically occurs by changing a resistance from 1K ohms to 500 ohms between a dedicated protection limit adjustment pin and a ground pin.

Alternatively, the protection limit adjustment is made by changing a particular external voltage (rather than resistance) that is provided between a dedicated protection limit adjustment pin and a ground pin of the power supply.

SUMMARY OF THE INVENTION

A disadvantage with conventional trimmable power supplies is that they use separate pins to respectively adjust the power supply output voltage and the power supply protection limit. Due to improvements in integrated circuit (IC) manufacturing techniques, and pressure to reduce the size of ICs, it has become relatively expensive for conventional trimmable power supplies to use multiple pins for such adjustments. Furthermore, it is fairly burdensome for such power supplies to require multiple external adjustment voltages (or multiple adjustment resistances) for proper operation and protection.

In contrast, an embodiment of the invention is directed to a technique for controlling a power supply using a single programming signal. The technique involves receiving a programming signal that indicates a power supply output voltage target value and further indicates a power supply output voltage limit. The programming signal is determined by a connection condition (a voltage or resistance) between an input pin and a reference pin. Accordingly, there is no requirement for multiple voltages or multiple resistances as with conventional power supplies. The technique further involves activating the power supply, such that the power supply provides a power supply output voltage according to the programming signal, and detecting an actual value of the power supply output voltage. Activation of the power supply is maintained when the actual value is less than the power supply output voltage limit, and the power supply is deactivated when the actual value is greater than the power supply output voltage limit.

Detecting the actual value of the power supply output voltage may involve generating a tracking signal that tracks the programming signal, and generating a compare signal according to the tracking signal and the power supply output voltage. As such, the compare signal indicates that the actual value of the power supply output voltage is (i) less than the power supply output voltage limit when the compare signal is less than a protection threshold voltage, and (ii) greater than the power supply output voltage limit when the compare signal is greater than the protection threshold voltage.

Preferably, the power supply includes a pulse width modulation circuit having a non-inverting input. In this situation, part of the power supply activation process involves providing a power supply threshold voltage to the non-inverting input of the pulse width modulation circuit. This power supply threshold voltage is based on the programming signal.

Furthermore, maintaining activation involves comparing a compare signal that is based on the power supply output voltage to a protection threshold voltage that is independent of the power supply threshold voltage. This comparison is made in order to determine whether the actual value of the power supply output voltage is greater than the power supply output voltage limit. Since the power supply threshold voltage and the protection threshold voltage are independent of each other, an inadvertent increase in both the power supply threshold voltage and the protection threshold voltage is unlikely. That is, an inadvertent rise in the power supply threshold voltage will not disable the protection feature. Similarly, an inadvertent rise in the protection threshold voltage will not affect the output voltage of the power supply.

Receipt of the programming signal may involve obtaining, as the programming signal, (i) a particular voltage value when a particular voltage or a particular resistance is provided between an input pin and a reference pin of the power supply, and (ii) a different voltage value that is different than the particular voltage value when a different voltage or a different resistance is provided between the input pin and the reference pin of the power supply. The different voltage is different than the particular voltage and the different resistance is different than the particular resistance.

Additionally, receipt of the programming signal may involve obtaining, as the programming signal, (i) a particular voltage value when a particular non-infinite resistance or an infinite resistance (an open circuit condition) is provided between an input pin and a reference pin of the power supply, and (ii) a different voltage value that is different than the particular voltage value when a different resistance is provided between the input pin and the reference pin of the power supply. The different resistance being different than the particular non-infinite resistance and the infinite resistance.

Another disadvantage with conventional trimmable power supplies is that such supplies generally use the same independent voltage reference source to provide a power supply threshold voltage and a protection threshold voltage. As such, improper operation or a failure of the independent voltage reference may damage the power supply as well as any connected circuits. For example, if the independent voltage reference source were to inadvertently increase, the power supply output voltage and the protection threshold will increase simultaneously. Accordingly, the protection circuit may not shut down the power supply. Rather, the power supply output voltage may be allowed to reach a level that damages the power supply and any connected circuits.

In contrast, another embodiment of the invention is directed to a technique for controlling a power supply that uses two independent threshold voltages. The technique involves receiving a programming signal that indicates a power supply output voltage limit, activating the power supply such that the power supply provides a power supply output voltage according to a power supply threshold voltage, generating a tracking signal that tracks the programming signal, and generating a compare signal according to the tracking signal and an actual value of the power supply output voltage. The technique further involves comparing the compare signal to a protection threshold voltage, maintaining activation of the power supply when the compare signal is less than the protection threshold voltage, and deactivating the power supply when the compare signal is greater than the protection threshold voltage. The protection threshold voltage and the power supply threshold voltage are independent of each other.

Preferably, a power supply threshold reference source operates to provide the power supply threshold voltage, and a protection threshold reference source, which is independent of the power supply threshold reference source, operates to provide the protection threshold voltage. Accordingly, a failure of one reference source does not necessarily lead to generation of an output voltage that damages the power supply and any connected circuits.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 2 is a chart of various power supply output voltages provided by the power supply system of FIG. 1 in response to various connection conditions.

FIG. 4 is a chart of various voltages within the power supply system of FIG. 1 in response to various connection conditions.

FIG. 5 is another chart of various voltages within the power supply system of FIG. 1 when the power supply system has particular internal resistances that are different than those for the chart of FIG. 4.

DETAILED DESCRIPTION OF A PREFERRED EMBODIMENT

Figure 1:
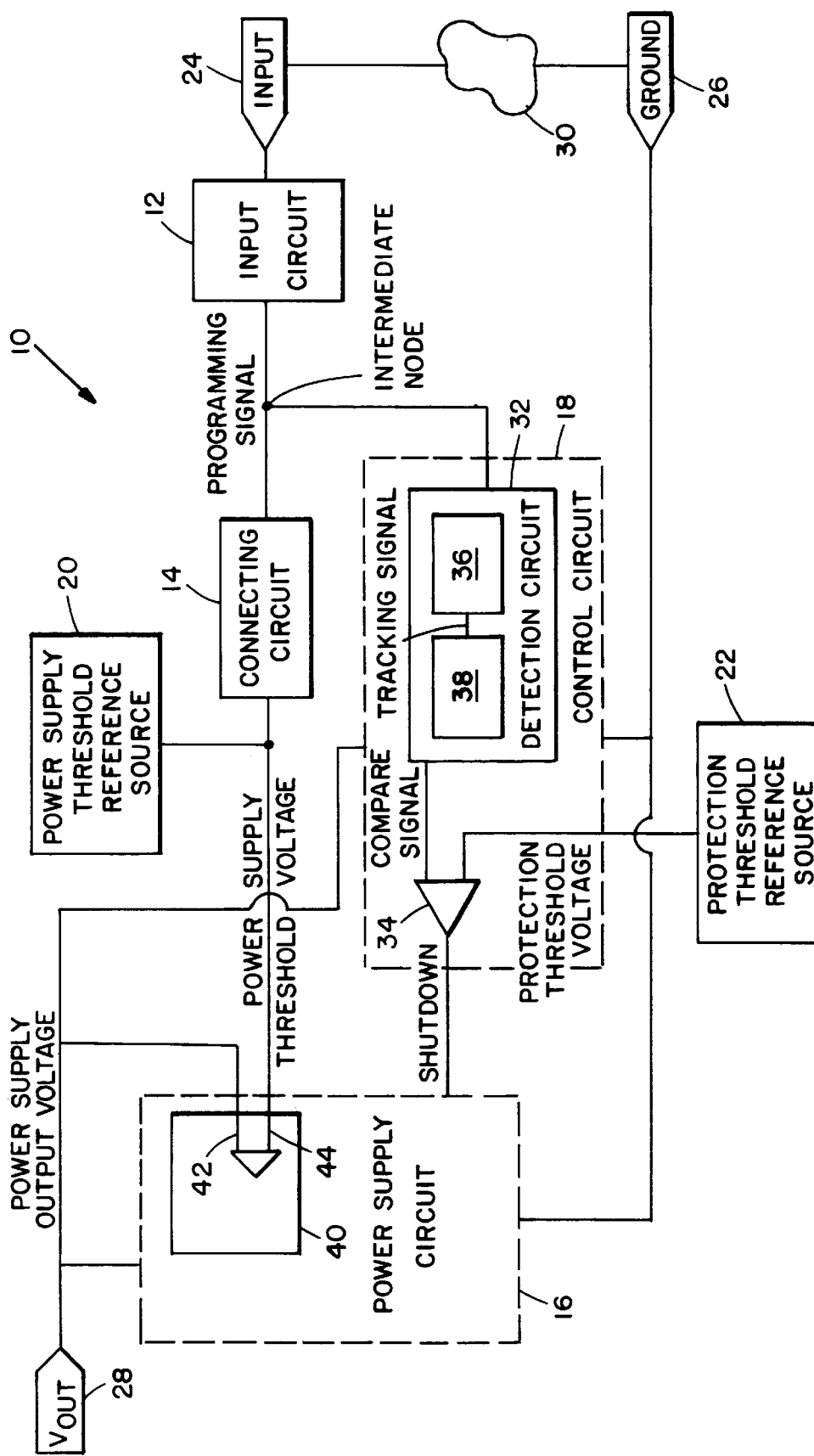
FIG. 1 is a block diagram of a power supply system according to the invention.

An embodiment of the invention is directed to a power supply system that uses a single input (i.e., a connection condition between an input pin and a reference pin) to adjust both an output voltage and a protection limit (a maximum voltage) of the power supply. As shown in FIG. 1, such a power supply system 10 includes an input circuit 12, a connecting circuit 14, a power supply circuit 16, a control circuit 18, a power supply threshold reference source 20, a protection threshold reference source 22, an input pin 24, a reference (or ground) pin 26, and a power supply output voltage pin 28 ($V_{OUT}$).

The power supply system 10 provides a power supply output voltage between the output voltage pin 28 and the reference pin 26 that is based on a connection condition 30 (e.g., a resistance or a voltage, an open circuit being an infinite resistance) between the input pin 24 and the reference pin 26. That is, the connection condition 30 sets a target value for the output voltage (e.g., 3.3 volts), and the power supply is designed to provide this output voltage target value.

Further details of how the connection condition 30 sets the output voltage will now be provided. First, the input circuit 12 generates a programming signal based on the connection condition 30. The programming signal adjusts a power supply threshold voltage (e.g., 1.0 volts) provided by the power supply threshold reference source 20. In particular, when the power supply threshold voltage is higher than the programming signal, the connecting circuit 14 lowers the power supply threshold voltage. Similarly, when the power supply threshold voltage is lower than the programming signal, the connecting circuit 14 raises the power supply threshold voltage. The power supply circuit 16 receives the adjusted power supply threshold voltage as an input and attempts to provide the power supply output voltage based on this input. Accordingly, the power supply output voltage ultimately is based on the connection condition 30.

The power supply circuit 16 uses pulse width modulation (PWM) to generate the power supply output voltage between the output pin 28 and the reference pin 26. In particular, the power supply circuit 16 includes a PWM circuit 40 having an inverting input 42 that receives the output voltage, and a non-inverting input 44 that receives the adjusted power supply threshold voltage. The PWM circuit 40 generates the output voltage using conventional PWM techniques. In particular, the PWM circuit 40 controls the charging of a capacitor that provides the output voltage. When the output voltage is less than the power supply threshold voltage, the PWM circuit 40 charges the capacitor to increase the power supply output voltage. Additionally, when the output voltage is greater than the power supply threshold voltage, the PWM circuit 40 does not charge the capacitor such that any circuits that draw charge from the capacitor cause the output voltage to decrease.

The power supply system 10 further provides protection against overvoltage conditions. In particular, the control circuit 18 prevents the power supply circuit 16 from inadvertently providing a voltage that is substantially higher than the output voltage target value (e.g., 20% higher). Further details of this feature will now be provided.

The connection condition 30 sets a protection limit for the output voltage in addition to setting the output voltage target value (e.g., 3.3 volts). This limit (e.g., 3.783 volts) is conveyed from the input and reference pins 24,26 to the control circuit 18 by the programming signal provided by the input circuit 12. The control circuit 18 generates a shutdown signal that is deasserted when the output voltage is less than the protection limit, and asserted when the output voltage is greater than the protection limit. The deasserted shutdown signal activates and maintains activation of the power supply circuit 16. The asserted shutdown signal deactivates the power supply 16 which then remains deactivated until the power supply system 10 is reset.

Further details of the control circuit 18 will now be provided. The control circuit 18 includes a detection circuit 32 and a compare circuit 34. The detection circuit 32 generates a compare signal based on the power supply output voltage and the programming signal. In particular, the detection circuit 32 normalizes the output voltage (e.g., 3.3 volts) based on the programming signal to generate the compare signal (e.g., 1.283 volts). The detection circuit 32 provides this normalized compare signal to one input of the compare circuit 34. The protection threshold reference source 22 provides a fixed protection threshold voltage (e.g., 1.5 volts) to another input of the compare circuit 34.

The compare circuit 34 (e.g., a comparator) generates the shutdown signal based on a comparison of the compare signal to the protection threshold voltage. In particular, when the compare signal is less than the protection threshold voltage (indicating that the output voltage is less than the protection limit), the compare circuit 34 provides the deasserted shutdown signal to maintain activation of the power supply circuit 16. However, when the compare signal is greater than the protection threshold voltage (indicating that the output voltage is greater than the protection limit), the compare circuit 34 provides the asserted shutdown signal to deactivate of the power supply circuit 16.

As explained above, the detection circuit 32 normalizes the power supply output voltage. The detection circuit 32 includes a tracking circuit 36 and normalizing circuitry 38 to perform this operation. The tracking circuit 36 receives the programming signal, and generates a tracking signal that substantially tracks the programming signal. For example, if the connection condition 30 causes the programming signal to be 1.0 volts, the tracking signal is approximately 1.0 volts. If the connection condition 30 changes such that the programming signal becomes 1.5 volts, the tracking signal becomes approximately 1.5 volts.

The normalizing circuitry 38 receives the actual value of the output voltage from the power supply circuit 16 (e.g., 3.3 volts), and generates the compare signal (e.g., 1.283 volts) based on the power supply output voltage and the tracking signal. In particular, the tracking signal lowers the voltage at the compare circuit input receiving the compare signal such that the voltage is normalized for comparison with the protection threshold voltage (e.g., 1.5 volts).

It should be understood that the power supply threshold reference source 20 and the protection threshold reference source 22 are independent of each other. As such, the power supply system 10, as a whole, is less susceptible to failure due to a reference source failure. In particular, if the power supply threshold reference source 20 were to fail and provide too high a voltage, the control circuit 18 would continue to receive a correct protection threshold voltage from the protection threshold reference source 22 and shut down the power supply circuit 16 when the output voltage exceeded the protection limit. Similarly, if the protection threshold reference source 22 were to fail and provide too high a voltage, the power supply circuit 16 would be unaffected by this failure and continue to operate normally. Conventional power supply systems that use a single voltage source to provide both a power supply threshold voltage for controlling an output voltage and a protection threshold voltage for controlling a protection limit may not shut down if the single voltage source inadvertently raises both thresholds.

It should be further understood that the connection condition 30, which sets both the output voltage and the protection limit of the power supply system 10, can be changed to simultaneously trim the power supply output voltage and the protection limit. FIG. 2 is a chart showing various target values for the output voltage ($V_{OUT}$) provided by the power supply system 10 for particular connection conditions 30. The output voltage is provided in terms of $V_{PROG}$ (e.g., 3.3 volts). As shown, when either a resistance of 500 ohms or a voltage of 0.5 volts is applied between the input pin 24 and the reference pin 26, the target value for $V_{OUT}$ is 90% of a nominal voltage $V_{PROG}$ (i.e., $V_{PROG}-(0.10)V_{PROG}$). When either a resistance of 1K ohms or a voltage of 1.0 volts is applied between the input pin 24 and the reference pin 26, the target value for $V_{OUT}$ is the nominal voltage $V_{PROG}$. When either a resistance of 1.5K ohms or a voltage of 1.5 volts is applied between the input and reference pins 24,26, the target value for $V_{OUT}$ is 110% of the nominal voltage $V_{PROG}$ (i.e., $V_{PROG}+(0.10)V_{PROG}$). Furthermore, when an open circuit connection condition exists between the input pin 24 and the reference pin 26 (the input and reference pins 24,26 are left unconnected such that there is infinite resistance between the two pins), the target value for $V_{OUT}$ is the nominal voltage $VP_{PROG}$. FIG. 2 further shows the voltage values for the programming signal for the various connection conditions 30.

It should be understood from an examination of FIG. 2 that the output voltage of the power supply system 10 is controllable using either resistance or voltage between the input and reference pins 24,26. This feature of the invention provides flexibility to the power supply system 10 since users of the system have a choice for the connection condition 30.

Figure 3B:
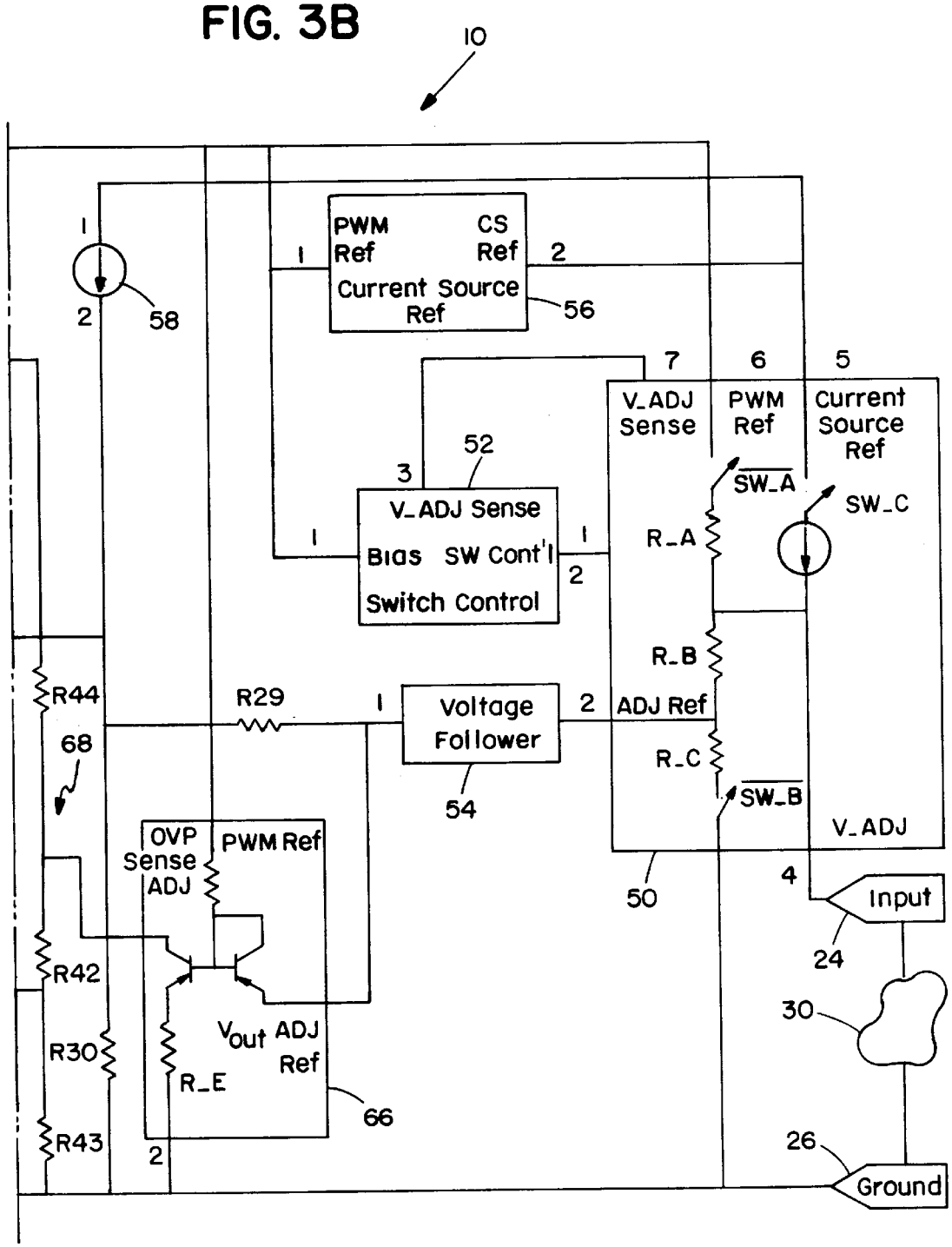
FIG. 3 is a schematic diagram of the power supply system of FIG. 1.

FIG. 3 provides a schematic diagram of the power supply system 10. The input circuit 12 (see FIG. 1) includes an adjustment circuit 50, a switch control circuit 52 and a voltage follower 54. The adjustment circuit 50 includes a voltage divider (resistors R__A, R__B and R__C), a current source CS__A (e.g., 1 mA), and three switches SW__A, SW__B, and SW__C. As explained above, input circuit 12 operates to provide a programming signal based on a connection condition 30 between the input and reference pins 24,26. In particular, the switch control circuit 52 detects whether the connection condition 30 is open, a resistance or a voltage, and provides a signal that controls the switches of the adjustment circuit based on such detection. In particular, when the connection condition 30 is an open circuit, the switch control block 52 closes switches SW__A and SW__B, and opens switch SW__C. Accordingly, the resistors R__A, R__B and R__C form a voltage divider that provides a signal to the voltage follower 54. In response, the voltage follower 54 provides the programming signal of the input circuit 12.

When an external resistance is provided between the input and reference pins 24,26 (e.g., a resistor or trim potentiometer), the current source CS__A provides a voltage across the external resistance. As a result, a target voltage (a nominal set point voltage) is set by the current source and resistor R30. In particular, if the voltage across the resistance (input and reference pins 24,26) is higher than a voltage initially across R30, the voltage follower 54 will source current through the resistor R29 (see the connecting circuit 14 in FIG. 1) to raise, or push up, the voltage across R30. Similarly, if the voltage across the resistance between the input and reference pins 24,26 is lower than the voltage initially across R30, the voltage follower 54 will sink current through the resistor R29 (see the connecting circuit 14 in FIG. 1) to lower the voltage across R30.

The external resistance between the input and reference pins 24,26 can be substituted with an external voltage source to control the output voltage and the protection limit of the power supply system 10. In this situation, the voltage follower 54 either sources or sinks current through R29 to adjust the voltage across R30 accordingly.

In the case of a particular external resistance (e.g., 1K ohms), a particular external voltage (1.0 volts) or an open circuit as the connection condition 30, the same voltage is provided by the voltage follower 54 as appears across the resistor R30. In this situation, no current flows through resistor R29, and the adjustment to voltage across R30 is in the form of keeping that voltage stable.

As shown in FIG. 3, the power supply system 10 includes a voltage source 56 and a current source 58 that form the power supply threshold reference source 20 (also see FIG. 1). Preferably, the voltage source 56 operates to form the current source CS__A of the adjustment circuit 50.

Further details of how the power supply circuit 16 provides the output voltage in the context of FIG. 3 will now be provided. The power supply circuit 16 includes a PWM device 60 and a power train stage 62. The PWM device 60 may be a conventional PWM controller such as a High Speed PWM Controller, Model No. UC3823A, provided by Unitrode Integrated Circuits Corporation of Merrimack, N.H. The PWM device 60 has an inverting input coupled to the output pin 28 and a non-inverting input coupled to R29. The PWM device 60 provides a PWM output signal to the power train stage 62 based on these inputs in order to control the output voltage between the output voltage pin 28 and the reference pin 26. In particular, the PWM device 60 varies the duty ratio of the PWM output signal to change the output voltage according to standard PWM techniques.

Further details of the protection limit feature of the invention will now be provided with reference to FIG. 3. As explained above, the control circuit 18 (see FIG. 1) includes a comparator 64, a mirror circuit 66 and a set of resistors 68. The comparator 64 forms part of the compare circuit 34 (see FIG. 1). The mirror circuit forms the tracking circuit 36 (FIG. 1). The set of resistors 68 forms the normalizing circuitry 38 (FIG. 1). When the power supply system 10 is in operation, the output voltage is divided across the set of resistors 68, and the mirror circuit 66 provides a voltage across its resistor R__E that tracks or mirrors the programming signal. The voltage across R__E causes some of the current through resistor R44 to be diverted through R__E. Such draining of current through R44 reduces feedback of the power supply output voltage to the comparator 64. The amount of current through R__E is proportional to the voltage value of the programming signal (i.e., the voltage outputted by the voltage follower 54). Furthermore, the voltage across resistor R43 is inversely proportional to the amount of current being diverted through R__E.

Furthermore, it should be understood that the power supply system 10 has a built in maximum overvoltage limit that limits the power supply output voltage when an incorrect connection condition 30 is provided between the input and reference pins 24,26. In particular, the arrangement of resistor R__E within the mirror circuit 66 provides a maximum overvoltage limit for the power supply system 10 in the event a wrong setting is provided between the input and reference pins 24,26.

It should be further understood that the voltage source 70 provides a fixed voltage to a voltage divider formed by resistors R75 and R74. Accordingly, the voltage across R74 is fixed and independent of the voltage across R30 (which is used to set up the output voltage target value). As a result, a failure of the voltage source 56 and the current source 58 forming the power supply threshold reference source 20 does not affect the protection threshold voltage across R74. Hence, the comparator 64 issues a deasserted shutdown signal when the voltage across R43 is less than the voltage across R74 (i.e., when the output voltage is less than the protection limit). Conversely, the comparator 64 issues an asserted shutdown signal when the voltage across R43 is greater than the voltage across R74 (i.e., when the output voltage is higher than the protection limit).

FIG. 4 is a chart showing various voltages for the power supply system in FIG. 3 in response to particular connection conditions 30. For example, when 1K ohms is provided between the input and reference pins 24,26, the target value for the output voltage is 3.3 volts, the protection limit is 3.783 volts, the programming signal is 1.0 volts, the voltage across resistor R74 is 1.5 volts, the voltage across resistor R43 is 1.283 volts. Furthermore, if the output voltage were to increase to 3.783 volts while the connection condition 30 is 1K ohms of resistance, the voltage across resistor R43 increases to 1.5 volts.

EQUIVALENTS

While this invention has been particularly shown and described with references to preferred embodiments thereof, it will be understood by those skilled in the art that various changes in form and details may be made therein without departing from the spirit and scope of the invention as defined by the appended claims.

For example, the connection condition 30 has been described as either a resistance, voltage, or open circuit. The resistance may be provided by trimming potentiometer to allow dynamic variations to be made to the output voltage and protection limit simultaneously.

Additionally, it should be understood that the set of resistors 68 (R44, R42 and R43) and the resistors R74 and R75 control the threshold voltages provided to the comparator of the control circuit 18 and the PWM device 60. These resistors may be replace with resistors of different values to change the output voltage and protection limit of the power supply system 10. For example, the power supply system 10 may provide a target value of 3.3 volts and a protection limit of 3.96 volts when either a 1k ohm resistance, 1.0 volts, or an open circuit condition exists between the input and reference pins 24,26. For a different set of resistances (i.e., resistors 68 and resistors R74 and R75), the power supply system 10 may provide a target value of 2.2 volts and a protection limit of 2.522 volts. Various voltages for the power supply system 10 in FIG. 3 in response to particular connection conditions 30 for such a change in resistances are provided in FIG. 5.

What is claimed is:

1. A method for controlling a power supply, comprising the steps of:
   receiving a programming signal that indicates a power supply output voltage target value and further indicates a power supply output voltage limit;
   activating the power supply such that the power supply provides a power supply output voltage according to the programming signal;
   detecting an actual value of the power supply output voltage; and
   maintaining activation of the power supply when the actual value is less than the power supply output voltage limit, and deactivating the power supply when the actual value is greater than the power supply output voltage limit.

2. The method of claim 1 wherein the step of detecting includes the steps of:
   generating a tracking signal that tracks the programming signal; and
   generating a compare signal according to the tracking signal and the power supply output voltage such that the compare signal indicates that the actual value of the power supply output voltage is (i) less than the power supply output voltage limit when the compare signal is less than a protection threshold voltage, and (ii) greater than the power supply output voltage limit when the compare signal is greater than the protection threshold voltage.

3. The method of claim 1 wherein the power supply includes a pulse width modulation circuit having a non-inverting input, and wherein the step of activating includes the step of:
   providing a power supply threshold voltage to the non-inverting input of the pulse width modulation circuit, the power supply threshold voltage being based on the programming signal.

4. The method of claim 3 wherein the step of maintaining includes the step of:
   comparing a compare signal that is based on the power supply output voltage to a protection threshold voltage that is independent of the power supply threshold voltage in order to determine whether the actual value of the power supply output voltage is greater than the power supply output voltage limit.

5. The method of claim 1 wherein the step of receiving includes the step of:
   obtaining, as the programming signal, (i) a particular voltage value when one of a particular voltage and a particular resistance is provided between an input pin and a reference pin of the power supply, and (ii) a different voltage value that is different than the particular voltage value when one of a different voltage and a different resistance is provided between the input pin and the reference pin of the power supply, the different voltage being different than the particular voltage and the different resistance being different than the particular resistance.

6. The method of claim 1 wherein the step of receiving includes the step of:
   obtaining, as the programming signal, (i) a particular voltage value when one of a particular non-infinite resistance and an infinite resistance is provided between an input pin and a reference pin of the power supply, and (ii) a different voltage value that is different than the particular voltage value when a different resistance is provided between the input pin and the reference pin of the power supply, the different resistance being different than the particular non-infinite resistance and the infinite resistance.

7. A power supply system, comprising:
   a power supply circuit;
   an input circuit, coupled to the power supply circuit, to provide a programming signal that indicates a power supply output voltage target value and further indicates a power supply output voltage limit; and
   a control circuit, coupled to the input circuit and the power supply circuit, to activate the power supply circuit such that the power supply circuit provides a power supply output voltage according to the programming signal, the control circuit including:
      a detection circuit to detect an actual value of the power supply output voltage, and
      a compare circuit to (i) maintain activation of the power supply circuit when the actual value is less than the power supply output voltage limit, and (ii) deactivate the power supply circuit when the actual value is greater than the power supply output voltage limit.

8. The power supply system of claim 7 wherein the detection circuit includes:
   a tracking circuit, coupled to the input circuit, to generate a tracking signal that tracks the programming signal; and
   normalizing circuitry, coupled to the tracking circuit and the compare circuit, to generate a compare signal according to the tracking signal and the power supply output voltage such that the compare signal indicates that the actual value of the power supply output voltage is (i) less than the power supply output voltage limit when the compare signal is less than a protection threshold voltage, and (ii) greater than the power supply output voltage limit when the compare signal is greater than the protection threshold voltage.

9. The power supply system of claim 7 wherein the power supply circuit includes a pulse width modulation circuit having a non-inverting input, and wherein the power supply system further comprises:

a connecting circuit, interconnected between the power supply circuit and the input circuit, to provide a power supply threshold voltage to the non-inverting input of the pulse width modulation circuit, the power supply threshold voltage being based on the programming signal.

10. The power supply system of claim 9 wherein the compare circuit includes:

a comparator to compare a compare signal that is based on the power supply output voltage to a protection threshold voltage that is independent of the power supply threshold voltage in order to determine whether the actual value of the power supply output voltage is greater than the power supply output voltage limit.

11. The power supply system of claim 7 further comprising:

an input pin; and a reference pin, the input circuit being coupled to the input pin and the reference pin, to provide, as the programming signal, (i) a particular voltage value when one of a particular voltage and a particular resistance is provided between the input pin and the reference pin, and (ii) a different voltage value that is different than the particular voltage value when one of a different voltage and a different resistance is provided between the input pin and the reference pin of the input circuit, the different voltage being different than the particular voltage and the different resistance being different than the particular resistance.

12. The power supply system of claim 7 further comprising:

an input pin; and a reference pin, the input circuit being coupled to the input pin and the reference pin, to provide, as the programming signal,(i) a particular voltage value when one of a particular non-infinite resistance and an infinite resistance is provided between the input pin and the reference pin, and (ii) a different voltage value that is different than the particular voltage value when a different resistance is provided between the input pin and the reference pin of the input circuit, the different resistance being different than the particular non-infinite resistance and the infinite resistance.

13. A method for controlling a power supply, comprising the steps of:

receiving a programming signal that indicates a power supply output voltage limit;

activating the power supply such that the power supply provides a power supply output voltage according to a power supply threshold voltage;

generating a tracking signal that tracks the programming signal;

generating a compare signal according to the tracking signal and an actual value of the power supply output voltage; and comparing the compare signal to a protection threshold voltage, maintaining activation of the power supply when the compare signal is less than the protection threshold voltage, and deactivating the power supply when the compare signal is greater than the protection threshold voltage, the protection threshold voltage being independent of the power supply threshold voltage.

14. The method of claim 13 wherein the step of generating the compare signal includes the step of:

reducing feedback of the power supply output voltage based on the tracking signal to form the compare signal.

15. The method of claim 13 further comprising the steps of:

operating a power supply threshold reference source to provide the power supply threshold voltage; and operating a protection threshold reference source, which is independent of the power supply threshold reference source, to provide the protection threshold voltage.

16. A power supply system, comprising:

a power supply circuit;

an input circuit to provide a programming signal that indicates a power supply output voltage limit; and a control circuit to activate the power supply circuit such that the power supply circuit provides a power supply output voltage according to a power supply threshold voltage, the control circuit including:

a tracking circuit, coupled to the input circuit, to generate a tracking signal that tracks the programming signal, normalizing circuitry, coupled to the tracking circuit, to generate a compare signal according to the tracking signal and an actual value of the power supply output voltage, and a compare circuit, coupled to the normalizing circuit and the power supply circuit, to compare the compare signal to a protection threshold voltage, maintain activation of the power supply when the compare signal is less than the protection threshold voltage, and deactivate the power supply circuit when the compare signal is greater than the protection threshold voltage, the protection threshold voltage being independent of the power supply threshold voltage.

17. The power supply system of claim 16 wherein the tracking circuit and the normalizing circuitry operate to reduce feedback of the power supply output voltage based on the tracking signal to form the compare signal.

18. The power supply system of claim 16 further comprising:

a power supply threshold reference source, coupled to the power supply circuit, to provide the power supply threshold voltage; and a protection threshold reference source, coupled to the compare circuit, to provide the protection threshold voltage, the protection threshold reference source being independent of the power supply threshold reference source.

19. A method for controlling a power supply that includes a pulse width modulation circuit having a non-inverting input, the method comprising the steps of:

receiving a programming signal that indicates a power supply output voltage target value and further indicates a power supply output voltage limit;

providing a power supply threshold voltage, which is based on the programming signal, to the non-inverting input of the pulse width modulation circuit such that the power supply provides a power supply output voltage according to the programming signal;

providing a protection threshold voltage that is independent of the power supply threshold voltage;

generating a tracking signal that tracks the programming signal;

generating a compare signal according to the tracking signal and the power supply output voltage; and comparing the compare signal to the protection threshold voltage, maintaining activation of the power supply when the compare signal is less than the protection threshold voltage, and deactivating the power supply when the compare signal is greater than the protection threshold voltage.

20. A power supply system, comprising:

a power supply circuit that includes a pulse width modulation circuit having a non-inverting input;

an input circuit, coupled to the power supply circuit, to receive a programming signal that indicates a power supply output voltage target value and further indicates a power supply output voltage limit;

a power supply threshold reference source, coupled to the power supply circuit and the input circuit, to provide a power supply threshold voltage, which is based on the programming signal, to the non-inverting input of the pulse width modulation circuit such that the power supply circuit provides a power supply output voltage according to the programming signal;

a protection threshold reference source to provide a protection threshold voltage that is independent of the power supply threshold voltage;

a tracking circuit, coupled to the input circuit, to generate a tracking signal that tracks the programming signal;

normalizing circuitry, coupled to the power supply circuit and the tracking circuit, to generate a compare signal according to the tracking signal and the power supply output voltage; and a compare circuit, coupled to the power supply circuit, the normalizing circuitry and the protection threshold reference source, to compare the compare signal to the protection threshold voltage, maintain activation of the power supply when the compare signal is less than the protection threshold voltage, and deactivate the power supply when the compare signal is greater than the protection threshold voltage.

* * * * *